S. A. KAPADIA.
PROCESS AND APPARATUS FOR PRESERVING FRUITS, VEGETABLES, GRAIN, AND OTHER ORGANIC SUBSTANCES.
APPLICATION FILED OCT. 5, 1914.
1,259,410.
Patented Mar. 12, 1918.
2 SHEETS—SHEET 1.
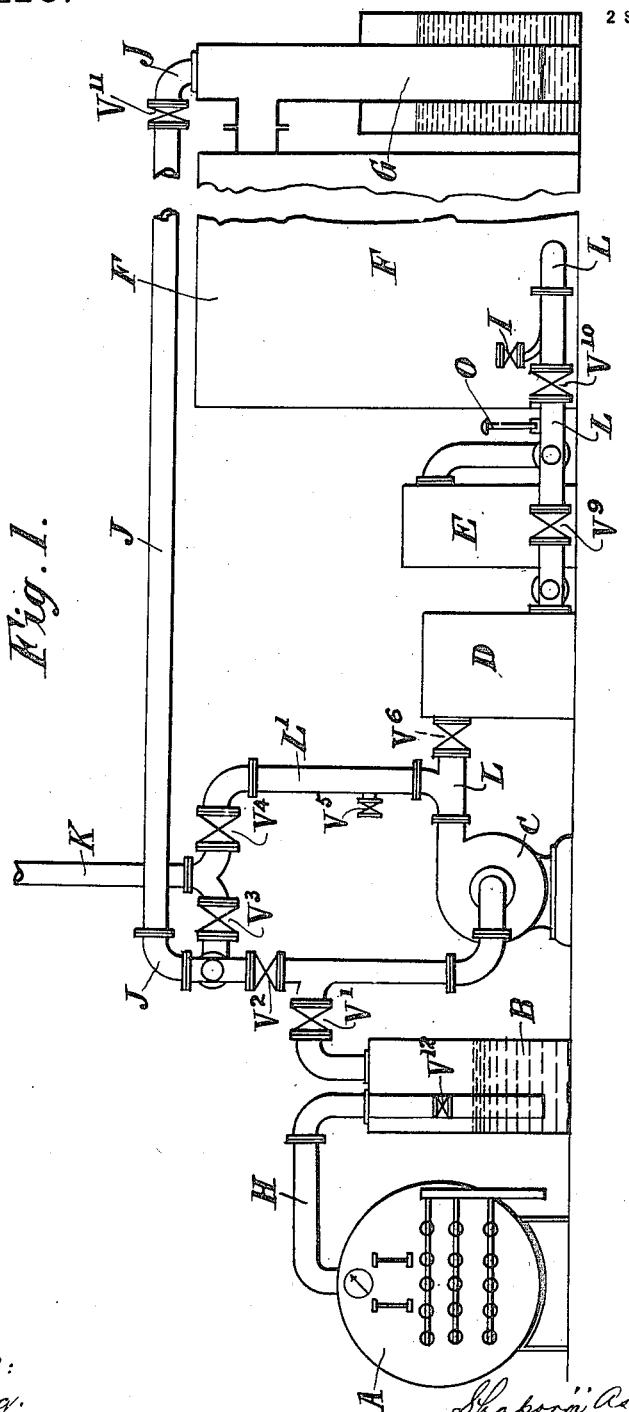
WITNESSES:
INVENTOR
ATTORNEY

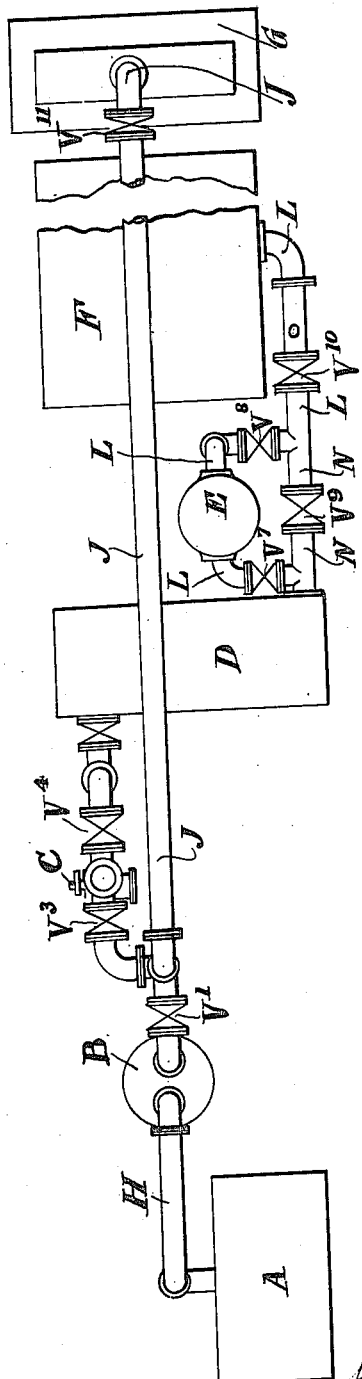

UNITED STATES PATENT OFFICE.

SHAPORJI A. KAPADIA, OF SOUTH KENSINGTON, LONDON, ENGLAND.

PROCESS AND APPARATUS FOR PRESERVING FRUITS, VEGETABLES, GRAIN, AND OTHER ORGANIC SUBSTANCES.

1,259,410.

Specification of Letters Patent.  Patented Mar. 12, 1918.

Application filed October 5, 1914.  Serial No. 865,085.

*To all whom it may concern:*

Be it known that I, SHAPORJI ASPANIARJI KAPADIA, doctor of medicine and barrister-at-law, a subject of the King of Great Britain, residing at 22 Redcliffe Gardens, South Kensington, London, England, have invented a certain new and useful Improved Process and Apparatus for Preserving Fruits, Vegetables, Grain, and other Organic Substances, of which the following is a specification.

This invention relates to an improved process and apparatus for preserving fruits, vegetables, grain or other organic substances and especially has for its object to preserve fruits of various kinds in a fresh condition for a prolonged period, *e. g.*, up to 6 or 8 weeks or more if required; and the invention relating to that type or kind of apparatus or process in which fruit or organic matter to be preserved placed in a closed chamber is deprived of the ordinary atmosphere for which latter is substituted a sterilized atmosphere composed of indifferent or inert gas or gases which latter may advantageously be at a pressure above the atmosphere and which is or are as far as possible of an incombustible nature and which is or are cooled and kept cool to the required degree and which may be circulated either continuously or from time to time as required in order that any moisture may be withdrawn and the gas or gases cooled, the gaseous mixture thus deprived of moisture and its temperature lowered then returned in a dried state to the chamber so that the moisture given off by the fruit is continuously removed and its temperature kept down to the desired degree.

Now the present invention is as follows:—

The indifferent or inert gas or gases (which I will hereinafter refer to as the "gas") may be derived from any suitable source such as the products of combustion of a surface combustion gas or liquid fuel fired furnace, the heat generated in the furnace being utilized for producing steam for driving the refrigerating plant, or from the exhaust gases of an internal combustion engine, such gases being suitably treated to prevent any excess of oxygen, or from cylinders containing such gas in a compressed state or liquid state or they may be derived from a suitable furnace by simply passing atmospheric air over or through a body of incandescent fuel or material such as coke. For the sake of example I will describe the present invention as used with a surface combustion gas fired furnace.

The inert gases coming from such furnace are by means of a rotary blower drawn through a water seal in which the temperature of the gas is lowered say to about 60 degrees Fahr. and is then forced through a refrigerating chamber of any suitable type whereby the gases are cooled and the major portion of the moisture carried in the gases is extracted, the temperature of the gases being cooled down to the temperature most suitable for the various kinds of fruit, etc. The cooled and partially dry gases are then passed through a desiccating chamber where the remaining moisture is extracted and the gas forced into the storage chamber.

The storage chamber will be as far as possible gas tight and will be insulated in order to avoid transmission of heat from the outside temperature so that the fruits may as far as possible be kept at a constant temperature.

The chamber is provided with the following fittings in order to expedite the easy working of the apparatus viz:—

(1) Observation apertures to enable the fruit or other organic matter inside the chamber to be seen from outside without entering the chamber.

(2) Pressure gages to show the pressure of the gas inside the chamber.

(3) Test cocks or gages for enbling samples of the gas to be withdrawn for the gas to be tested for oxygen or moisture.

(4) Suitable thermometers for indicating the temperature of the chamber.

(5) An excess pressure water seal or safety valve to relieve automatically any excess of pressure in the said storage chamber instantaneously.

(6) An injector or injectors or other suitable means for spraying or otherwise injecting or introducing into the said chamber any desired liquid or gas as for example (*a*)

formaldehyde or other germicide or/and (b) ethereal salts or/and (c) an anesthetic such as ether or chloroform.

It will be obvious that any other suitable gage or gages or any other devices such as indicators or otherwise may be employed in conjunction with this storage chamber if required and the various gages may be fixed in the pipework in connection with the storage chamber if so desired.

Or/and any or all of these last named substances in (6) or gases may be introduced at any other suitable point in the system (instead of being introduced direct into the storage chamber) for example some may be introduced into the gas at any suitable point between the water seal and the storage chamber.

From the storage chamber a discharge pipe or passage (or pipes or passages) is provided leading either to the outside atmosphere or to the suction side of the rotary blower so that the gas may be circulated around the system.

The operation is as follows:—

An air tight storage chamber of any convenient dimensions may be employed, and after the organic substances to be preserved have been placed therein and the chamber closed I pass into this chamber a gaseous mixture composed of carbon dioxid, carbon monoxid, hydrogen and nitrogen, the last named preponderating. The percentage of carbon-monoxid being reduced to as small a percentage as possible in order to render the gas practically incombustible.

The apparatus is so arranged that when this gaseous mixture is introduced into the air-tight storage chamber, the air therein will be driven out so that the chamber will contain practically nothing but the mixture of the gases specified above and the fruits or other organic substances to be treated.

The gaseous mixture in the chamber will be circulated continuously or intermittently in order to remove any moisture given out by the fruit and in order to keep the gas cooled to the requisite degree, the circulation being adjusted to suit the various kinds of fruits or other organic matters under treatment.

Oxygen from any suitable source is or may be advantageously introduced in to the aforesaid storage chamber from time to time as and when required to keep the fruit, etc., in normal or fit condition, e. g., pure oxygen may be so used or sterilized atmospheric air may be employed. Alternatively according to the nature of the fruit a small percentage of oxygen may be introduced into the chamber when charging with the other sterilized gas so that development of the fruit may take place, but at a very slow rate.

Germicides such as formaldehyde or sulfur dioxid or chlorin, etc., may be introduced (e. g., through the injector) into the chamber for preserving the substances such as fruits from germs, bacteria, etc. Also ethereal salts or alcohol may be similarly introduced if desired.

I will now proceed to further describe my present invention with reference to the accompanying drawings Figure 1 of which illustrates a working plant or apparatus according to this invention and Fig. 2 is a plan thereof.

A is a furnace in connection with a steam boiler, etc., into which gas or liquid fuel is introduced and passed over incandescent material in the usual way with surface combustion, the heat generated being used for producing steam for driving the refrigerating plant.

B is a water seal through which the gases from the furnace are drawn by the rotary blower C in order to cool the gases and cleanse them. The water seal also acts as a seal to prevent the gases flowing back to the furnace A from the system when the blower is not working.

D is the refrigerating chamber containing cooling coils over which the gas is forced by the blower C.

E is the desiccating chamber through which the gas is passed for drying and is "by-passed" in order to allow the drying material to be changed without losing the charge of gas in the remainder of the system. This desiccator E may comprise three towers in series (not shown) the first containing hydrated ferric oxid arranged on trays in order to absorb any sulfureted hydrogen produced by combustion. The second and third trays may contain desiccating reagents such as quick lime, calcium chlorid, etc., the trays all being removable so that the re-agents may be renewed. Alternatively the desiccator and refrigerating coils may be placed inside the storage chamber and a separate fan used for circulating the gases.

The gas after leaving the desiccator chamber E is led through the pipe L into the fruit chamber F.

The fruit chamber F is as far as possible air tight, insulated, and lined with fire-resisting material. The door (not shown) of this chamber F may be provided with glass panes (through which the condition of the fruits may be observed from time to time) and can be securely bolted and made gas tight.

G is an excess pressure water seal which in the unlikely event of a sudden rise in pressure owing to negligence automatically relieves the pressure instantaneously in the chamber and thus prevents any harmful effects therefrom.

$V^1$ is a valve in the pipe between the furnace and the blower.

$V^2$ is a valve in the return main J.

$V^3$ is a valve between the return main J and the pipe K to atmosphere.

$V^4$ is a valve between the branch pipe $L^1$ (delivery side of blower) and the pipe K.

$V^5$ is a gas testing cock for sampling purposes.

$V^6$ is a valve in the delivery pipe L for shutting off the system from the blower.

$V^7$ and $V^8$ are valves on the desiccator for shutting the said desiccator out of the system.

$V^9$ is a valve for short circuiting the desiccator.

$V^{10}$ is a valve for shutting off the storage chamber on the delivery side.

$V^{11}$ is a valve for shutting off the chamber on the suction side of the atmosphere.

I is the injector.

L is the delivery pipe from the blower to the chamber F when the valve $V^4$ is closed and valve $V^6$ open; while when the valve $V^6$ is closed and the valve $V^4$ open the branch pipe $L^1$ becomes delivery pipe from the blower to the discharge pipe K to the atmosphere.

J is the suction pipe or passage from the chamber.

K is the pipe to atmosphere.

N is the by-pass with valve $V^9$ therein for by-pass purposes for the desiccator.

In operation: all valves except $V^1$ and $V^4$ are closed when commencing charging. The furnace and blower are then started up and when the desired conditions have been obtained the valve $V^4$ is closed and the valves $V^6$ $V^7$ $V^8$ $V^{10}$ $V^{11}$ and $V^3$ are opened and the air is driven out of the chamber. When this has been accomplished the valve $V^3$ is closed and the pressure of gas in the chamber is allowed to rise. After the necessary pressure has been obtained the furnace is shut off and the valve $V^1$ closed and $V^2$ is opened so that the gas can circulate around the system.

By any suitable means germicides, e. g., sulfur-dioxid, formaldehyde, chlorin, etc., or/and ethereal salts or alcohol may be introduced in the fruit chamber; for example the gas after leaving the desiccator chamber E is impregnated on its way to the storage chamber F with germicides or disinfectants, etc., by means of an injector O; or the gas may be caused or allowed to bubble through a receptacle (not shown) containing the disinfectant fluid, etc., before it enters the fruit chamber F.

The amount of the germicide or disinfectant used should be in very small quantities and at long intervals. The rate of such injector is regulated by means of valves or cocks adapted for the purpose.

I may employ a gage containing calcium chlorid to indicate the presence of moisture and a gage containing phosphorus to indicate (even small traces of) oxygen by fuming, when the connecting cocks are turned on. Thermometers to indicate the temperature of the top and the bottom of the chamber may be used and a pressure gage to indicate the pressure of the gas mixture inside the chamber.

Safety valves may be used instead of the excess pressure water seal G, these appliances being led to pipes or passages leading to atmosphere so that when desired the gaseous mixture may be carried from the chamber into the atmosphere at any desired distance.

When it is desired to discharge the gaseous contents from the chamber F the valve $V^3$ is opened after closing $V^2$ and the valve $V^1$ opened so that the discharge gases are sent through the pipes K to atmosphere at any desired distance.

Particular features of this invention to render the apparatus perfectly safe and reliable in use are as follows:—

The gases used are such that contain only a small percentage of carbon-monoxid under the worst conditions, and are therefore incombustible.

The supply pipe H from the furnace to the chamber is fitted with a water seal B and is also fitted with a non-return valve $V^{12}$ for preventing the gaseous mixture from the chamber F from traveling back and (if explosive) becoming ignited at the furnace. This can only take place when the fan is not running and the valve $V^1$ is negligently left open after charging.

The excess water seal G will instantly relieve any abnormal pressure.

By the aforesaid arrangement the gaseous contents of the apparatus can be kept under a pressure above atmospheric pressure so that leakage into the system of outside air is absolutely prevented.

Lamps if used for illuminating the chamber F are all purposely put outside the chamber or bulkhead fittings used. From the glass door a good view of the interior of the chamber can be obtained as the lamps are above the chamber so that there is no need for fitting lamps inside the chamber.

All places where leakage is likely to occur outward are thoroughly ventilated.

What I claim is:—

1. A preserving apparatus comprising a chamber for receiving the articles to be preserved, a generator of inert gas, a cooler, a desiccator, and means for conveying the gas from said generator first through the cooler, then to the desiccator, and thereupon into said chamber.

2. A preserving apparatus comprising a chamber for receiving the articles to be preserved, a generator of inert gas, a gas-propelling apparatus having means for connecting its suction side either with said generator or with said chamber, a connection from the delivery side of said apparatus to said chamber, a cooler and a desiccator located in series in said delivery connection.

3. A method of preserving which consists in first cooling an inert gas to partly dry it, then effecting a further removal of moisture by hygroscopic substances, and thereupon treating the articles to be preserved, with the dry cool inert gas thus obtained.

4. A method of preserving which consists in treating the articles to be preserved with a dry cool inert gas, then subjecting the gas which has been used for such treatment, to refrigeration to remove part of the moisture it may have absorbed, and to the action of hygroscopic substances, and then again treating said articles with the gas thus cooled and dried.

In witness whereof I have hereunto set my hand in presence of two witnesses.

S. A. KAPADIA.

Witnesses:
H. BIRKBECK,
HERBERT D. JAMESON.